United States Patent
Hunter

(10) Patent No.: US 8,309,017 B2
(45) Date of Patent: Nov. 13, 2012

(54) OFF-GAS HEAT RECOVERY AND PARTICULATE COLLECTION

(76) Inventor: William C. Hunter, Seattle, WA (US)

(*) Notice: Subject to any disclaimer, the term of this patent is extended or adjusted under 35 U.S.C. 154(b) by 315 days.

(21) Appl. No.: 12/621,474

(22) Filed: Nov. 18, 2009

(65) Prior Publication Data

US 2010/0123275 A1 May 20, 2010

Related U.S. Application Data

(60) Provisional application No. 61/115,816, filed on Nov. 18, 2008.

(51) Int. Cl.
*B65H 20/00* (2006.01)
(52) U.S. Cl. .................. 266/157; 266/156
(58) Field of Classification Search .............. 266/156, 266/157
See application file for complete search history.

(56) References Cited

U.S. PATENT DOCUMENTS

| | | | |
|---|---|---|---|
| 2,142,100 A * | 1/1939 | Avery | 266/156 |
| 3,389,897 A * | 6/1968 | Tunder et al. | 266/157 |
| 3,741,557 A | 6/1973 | Harbaugh et al. | |
| 3,870,507 A | 3/1975 | Allen | |
| 3,887,340 A | 6/1975 | Hsu et al. | |
| 3,955,964 A | 5/1976 | MacDonald et al. | |
| 4,035,179 A | 7/1977 | Calderon | |
| 4,072,299 A | 2/1978 | Calderon | |
| 4,373,949 A | 2/1983 | Spruell et al. | |
| 4,653,064 A | 3/1987 | Hixenbaugh | |
| 4,679,774 A | 7/1987 | Lawrence et al. | |
| 4,840,355 A | 6/1989 | LaBate | |
| 5,407,179 A | 4/1995 | Whipp | |
| 5,560,762 A | 10/1996 | Bresser et al. | |
| 5,785,733 A | 7/1998 | Lee et al. | |
| 5,833,734 A | 11/1998 | Cip et al. | |
| 5,968,227 A | 10/1999 | Goldstein et al. | |
| 6,129,888 A | 10/2000 | Goldstein et al. | |
| 6,241,805 B1 | 6/2001 | Lynn et al. | |
| 6,521,170 B2 | 2/2003 | Stercho | |
| 6,562,101 B1 | 5/2003 | Price et al. | |

OTHER PUBLICATIONS

Jamek, Karl, "Innovative Offgas Cleaning and Recovery Solutions for Steelmaking." Iron & Steel Technology, Nov. 2009.
U.S. Envrionmental Protection Agency, "Energy Trends in Selected Manufacturing Sectors: Opportunities and Challenges for Environmentally Preferable Energy Outcomes." Final Report, Mar. 2007.

* cited by examiner

*Primary Examiner* — Scott Kastler
(74) *Attorney, Agent, or Firm* — Rutan & Tucker, LLP

(57) ABSTRACT

An exhaust stream buffering system is described to temper a temperature profile and reduce a particulate load to permit heat recovery and cleaning. The buffering system may reduce the volatile temperature profile to even the temperature spikes, and produce a more even cyclical temperature profile. When used in steel making facilities, the buffered stream may also be augmented by blast furnace gases to provide additional energy for a heat recovery system.

5 Claims, 4 Drawing Sheets

OFF-GAS HEAT RECOVERY AND PARTICULATE COLLECTION

PRIORITY

This application claims the benefit of priority to U.S. Provisional Patent Application No. 61/115,816, filed Nov. 18, 2008, which is incorporated by reference in its entirety into this application.

BACKGROUND

Basic oxygen furnaces are typically used in an integrated steel mill to turn carbon-rich molten pig iron into steel. Raw materials including iron ore, limestone, and coal, coke, and fluxing agents are charged in batches in a blast furnace, which produces molten iron. Generally, molten iron from a blast furnace is poured into a ladle. A basic oxygen furnace is then used to convert the molten iron, along with steel scrap and alloys into refined steel. Substantially pure oxygen is blown onto the steel and iron, igniting the carbon dissolved in the steel and burning it to form carbon monoxide and carbon dioxide. The ore gives up excess oxygen and becomes liquid iron. The burning brings the temperature up to approximately 1700 degrees C. and melts the scrap. Other processes may be included, such as adding flux, to remove impurities. The resulting steel is then poured from these ladles. The process is known as basic due to the pH of the refractories—calcium oxide and magnesium oxide—that line the vessel to withstand the high temperature of molten metal. Electric arc furnaces may also be used.

The basic oxygen furnace, and the electric arc furnace both produce significant waste heat and fuel, in the form of carbon monoxide through the exhaust gas. The reaction that allows the steel to liquefy uses direct injection of oxygen and results in extremely hot, dirty gas released into the atmosphere. Difficulties arise in recovering this energy because of the cyclical nature of the system causing rapid changes in temperature that create thermal shock to equipment. A large volume of particulate is also entrained in the hot exhaust gas that can coat heat transfer surfaces, causing reductions in energy capture and mechanical failures. It has generally been concluded that the severity of the environment precludes the use of heat recovery. The US EPA, in the *US EPA Energy Trends in Selected Manufacturing Sectors: Opportunities and Challenges for Environmentally Preferable Energy Outcomes*, dated March 2007, indicates a low potential for heat recovery in electric arc furnace heat recovery due to the low demand for steam and waste heat is difficult to recover. With the greater temperature fluctuation and higher particulate loading in the blast furnace, it is likely that the conclusion would be the same.

Therefore, the focus presently is on recovering carbon monoxide gas and pre-heating scrap. However, both of these areas represent lower energy recovery and benefits that preclude the burning of blast furnace waste gas. There are many other disadvantages, including high energy consumption at the induced draft (ID) fan, natural gas consumption at the bypass flare, poor particulate removal, and high greenhouse gas emissions.

Currently, there are approximately 25 basic oxygen steelmaking facilities in North America that utilize about 56 furnaces. These facilities have an approximate capacity of 69.8 million tons/year with an estimated 0.7 mmBtu's wasted per ton of steel produced. There are approximately 72 facilities using electric arc furnaces, with an approximate total capacity of 69.5 million tons/year with an estimated 0.341 mmBtu wasted per ton of steel produced. Therefore, a total of approximately 72.5 million mmBtu of energy is lost per year. Developing this potential energy reserve could produce an average of 15 MW at 97 facilities, offsetting over $500 million/year of electrical generation costs, and over 4 million tons of carbon dioxide production per year. However, modifying the standard exhaust gas treatment from steel production present challenges, including the extreme variability of temperature in the gas stream (potentially over 800° C.), and the very high particulate loading entrained in the gas. Specifically, thermal stress causes refractory to crack, and metallurgy to grow rapidly, resulting ultimately in mechanical failure. Heavy particulate loading coats heat transfer surfaces and erodes insulation and piping in high velocity areas.

Examples of steel furnaces, steel making processes, and pollution control in steel processes may be found in, for example, U.S. Pat. No. 4,072,299 to Calderon, entitled "Method and Apparatus for Basic Oxygen Steel Making Employing the Off-Gas Principle of Pre-Heating Purposes," issued Feb. 7, 1978; U.S. Pat. No. 5,407,179 to Whipp, entitled "Fluidized Bed Direct Steelmaking Plant," issued Apr. 18, 1995; U.S. Pat. No. 3,887,340 to Hsu et al., entitled "Method for Scrubbing Gases Derived from Basic Oxygen Furnaces," issued Jun. 3, 1975; U.S. Pat. No. 4,840,355 to LaBate, entitled "Slag Controlling Device for Basic Oxygen Furnaces," issued Jun. 20, 1989; U.S. Pat. No. 4,653,064 to Hixenbaugh, entitled "Gas Collector for Metallurgical Vessels," issued Mar. 24, 1987; U.S. Pat. No. 4,035,179 to Calderon, entitled "Method and Apparatus for Controlling Pollution in Steel Furnaces," issued Jul. 12, 1977; U.S. Pat. No. 6,241,805 to Lynn et al., entitled "Method and System for Improving the Efficiency of a Basic Oxygen Furnace," issued Jun. 5, 2001; U.S. Pat. No. 4,373,949 to Spruell et al., entitled "Method for Increasing Vessel Lining Life for Basic Oxygen Furnaces," issued Feb. 15, 1983; U.S. Pat. No. 6,562,101 to Price et al., entitled "Processing Electric Arc Furnace Dust Through a Basic Oxygen Furnace," issued May 13, 2003; U.S. Pat. No. 3,741,557 to Harbaugh et al., entitled "Apparatus for Control of Carbon Content in Steel Produced in Basic Oxygen Furnace Process," issued Jun. 26, 1973; U.S. Pat. No. 5,560,762 to Bresser et al., entitled "Process for the Heat Treatment of Fine-Grained Iron Ore and for the Conversion of the Heat Treated Iron Ore to Metallic Iron," issued Oct. 1, 1996; U.S. Pat. No. 5,785,733 to Lee et al., entitled "Fluidized Bed Type Reduction Apparatus for Iron Ore Particles and Method for Reducing Iron Ore Particles Using the Apparatus," issued Jul. 28, 1998; U.S. Pat. No. 5,833,734 to Cip et al., entitled "Process for the Direct Reduction of Particulate Iron-Containing Material and a Plant for Carrying Out the Process," issued Nov. 10, 1998; U.S. Pat. No. 6,129,888 to Goldstein et al., entitled "System and Method for Minimizing Slag Carryover During the Taping of a BOF Converter in the Production of Steel," issued Oct. 10, 2000; U.S. Pat. No. 5,968,227 to Goldstein et al., entitled "System and Method for Minimizing Slag Carryover During the Tapping of a BOF Converter in the Production of Steel," issued Oct. 19, 1999; U.S. Pat. No. 4,679,774 to Lawrence et al., entitled "Fluid Conduit Coupling for a Metallurgical Converter Trunnion," issued Jul. 14, 1987; U.S. Pat. No. 3,870,507 to Allen, entitled "Control of Pollution by Recycling Solid Particulate Steel Mill Wastes," issued Mar. 11, 1975; U.S. Pat. No. 3,955,964 to MacDonald et al., entitled "Process for Making Steel," issued May 11, 1976; and U.S. Pat. No. 6,521,170 to Stercho, entitled "Revamping of a Basic Oxygen Furnace Installation to Provide an Electric Furnace Facility," issued Feb. 18, 2003. Each of the foregoing references are incorporated by reference in its entirety into this application.

BRIEF SUMMARY

A heat recovery system for an exhaust stream with a variable temperature profile and particulate loading is described, including a buffering chamber including heat sink surfaces to reduce temperature spikes from the exhaust stream, a particulate buffering chamber including cyclonic areas to separate large particulate from the exhaust stream, and a heat recovery system.

A heat recovery and particulate removal system for an exhaust stream with a variable temperature profile and particulate loading is described, including a temperature buffering section to reduce a temperature variance of the exhaust stream from over approximately 500° C. to under approximately 500° C., a particulate buffering section separating particulate of about 10 micrometers or more from the exhaust stream, a heat recovery system, and an emissions control system.

A method of preparing an exhaust stream for heat recovery and particulate removal is also described, including extracting an exhaust stream including a fluctuating temperature range having a variance of approximately 400° C. or more and a variable particulate load from a source; contacting the exhaust stream with a plurality of heat sink surfaces to produce a temperature buffered stream, wherein a temperature spike of the exhaust stream is reduced through heat absorption; separating particulates greater than about 10 micrometers from the temperature buffered stream to produce a temperature and particulate buffered stream, wherein the particulates are removed through cyclonic separation; and passing the temperature and particulate buffered stream to a heat recovery system.

BRIEF DESCRIPTION OF THE DRAWINGS

FIG. 4 illustrates an exemplary steel mill system according to embodiments of the invention including emission controls.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and do not limit the present invention nor are they necessarily drawn to scale. Although embodiments of the invention may be described and illustrated herein in terms of basic oxygen furnace steel mills, it should be understood that embodiments of this invention are not so limited, but are additionally applicable to electric arc furnace steel mills.

Waste heat from the Basic Oxygen Furnaces from integrated steel mills is used to generate steam. A combination of cyclonic separation and heat sink is used to reduce the particulate loading and volatility of the temperature profile. The blast furnace gases (primarily CO and $H_2$) are injected into the duct prior to the heat recovery steam generator, which will react when the temperature exceeds the auto-ignition temperature (approximately 600° C. or 1100° F.). This exothermic reaction will add energy to the incoming exhaust stream. The combined heat will be used to generate steam that can be used to offset coal-filled steam production, and/or add electrical generation capacity at the steel mill. Following the heat recovery steam generator is a venturi scrubber combined with a wet electrostatic precipitator to clean the exhaust gas stream. Induced draft fans then send the clean, cool gas to the atmosphere.

Basic Oxygen Furnace

Figure 1:
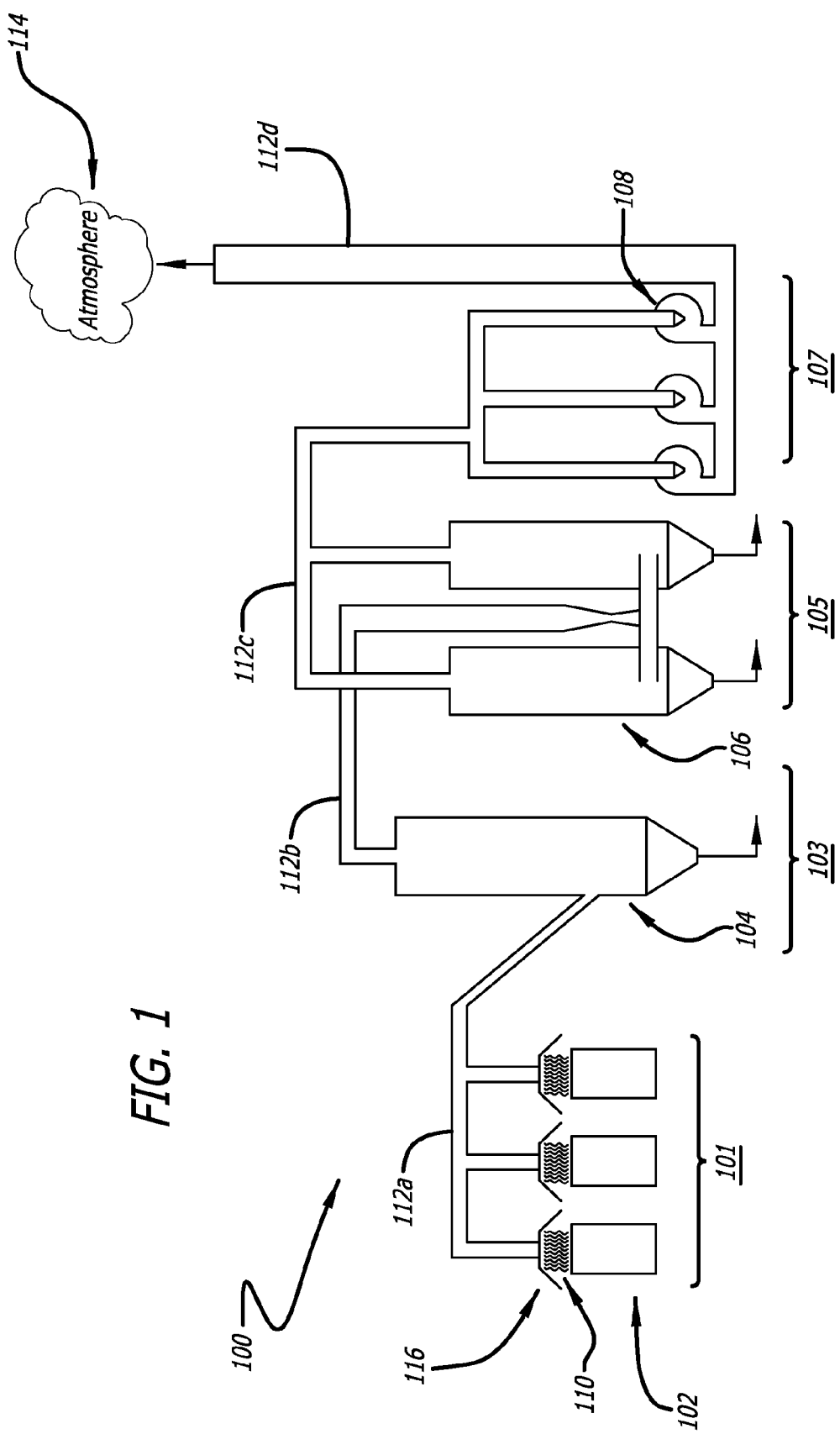
FIG. 1 illustrates an exemplary integrated steel mill system.

FIG. 1 illustrates an exemplary integrated steel mill system. The system 100 includes steel making facilities 101, exhaust cooling facilities 103, exhaust cleaning facilities 105, and an exhaust system 107. In an exemplary embodiment the steel making facilities 101 include basic oxygen furnaces 102, but may also utilize electric arc furnaces. The gas cooling facilities 103 may include a quench vessel 104, while the exhaust cleaning facilities 105 may include a venturi scrubber 106. The exhaust system 107 may utilize exhaust fans 108 to move exhaust gases 110 from the steel making facilities 101 through the system 100 along path 112 and into the atmosphere 114.

In an exemplary embodiment, the basic oxygen furnaces 102 contain the steel. Oxygen is directly injected within the basic oxygen furnaces 102 to ignite the carbon dissolved in the steel and liquefy the steel. Carbon monoxide and carbon dioxide are formed causing the temperature to rise to about 1700° C. (3000° F.). The furnaces generally operate on a cycle. In one embodiment, the cycle may be approximately a 45 minute cycle, during which each furnace operates for about 20 minutes reacting. The rest of the cycle has varying temperatures. Hot and dirty exhaust gases 110 are released during this reaction. The exhaust gases vary in temperature given the cyclic nature of the system. The exhaust gasses 110 emitted from the basic oxygen furnaces 102 along path 112a may exceed 1000° C. (1800° F.) while the main reaction is occurring, and may reach 1400° C. (2500° F.) or more. The temperature may vary over 400° C. (700° F.) or 500° C. (900° F.), and is more likely to vary by at least 650° C. (1200° F.) or 1000° C. (1800° F.) or more. These temperature variations may occur over short periods of time. For example, the cycle of a basic oxygen furnace may be 20 minutes, thus the temperature may spike between local maximum and minimum one or more times over a period of 10 to 15 minutes. One temperature extreme, from a local maximum to a local minimum, may occur over approximately 10 minutes, 5 minutes, or under.

In one embodiment, these exhaust gases 110 are collected by a pollution control device 116 and directed along path 112a to the exhaust cooling facilities 103. The cooling facilities 103 are used to cool the exhaust gas below the auto-ignition temperature to reduce the chance of igniting the combustible gases. The gas is generally cooled and cleaned with a wet system to prevent ignition of the potentially combustible off-gas, containing hydrogen and carbon monoxide. In one embodiment, the exhaust cooling facilities 103 include a quench vessel 104. The quench vessel 104 cools the exhaust gas before it is treated for emissions reduction. The quench vessel 104 uses evaporative cooling to saturate the gas stream. Thus, the exhaust gases are cooled before entering the gas cleaning facilities 105 in order to prolong equipment and facility life and reduce wear from the varying extreme temperatures produced from the steel making process. Therefore, the quench vessel 104 may take the hot exhaust gas (reaching 1400° C. (2500° F.) or more) and cools the gas to approximately 70° C. (150° F.).

The gas is then directed along path 112b through the exhaust cleaning facilities 105 to cool and clean the exhaust gas before releasing to the atmosphere 114. In one embodiment, the gas cleaning facilities 105 include a venturi scrubber 106. Venturi scrubbers control air emissions by creating high velocity that will allow particles to collide with water droplets. Once the particle is embedded in the water droplet, it can be removed more easily. Because these particles can be very small, significant velocity is generally required to impart sufficient momentum into these low-mass particles to overcome the surface tension of a water droplet. To provide sufficient velocity to the particle, velocity is provided to the entire air stream. Applying energy to the entire air stream instead of just the particle is highly inefficient. The energy loss is manifest in electrical energy required to drive induced draft fans that overcome the resistance of the venturi scrubber. The gas then travels from the venturi scrubber 106 along path 112c with the use of fans 108 and to the atmosphere 114 along path 112d.

The system 100 may have excess low Btu gas available from the blast furnace plant. This excess gas, consisting mainly of CO and $H_2$ may be used as much as possible within the gas and/or coal fired boilers. What cannot be consumed in the boiler is flared. Flares require a pilot burner to assure combustion of the waste gas, which consumes natural gas. Alternatively, after the gas has been cooled and cleaned, it goes to a collection system where the CO and $H_2$ mixture is stored until it can be used in one of the existing boilers on site. However, if the oxygen content is too high, as indicated by oxygen sensors within the gas stream, the gas may be deemed too dangerous to store. Thus, for example, if the oxygen content is above approximately 5%, the gas is flared. The flares require a natural gas pilot sized burner to assure the gas remains ignited.

Buffering System

Figure 2:
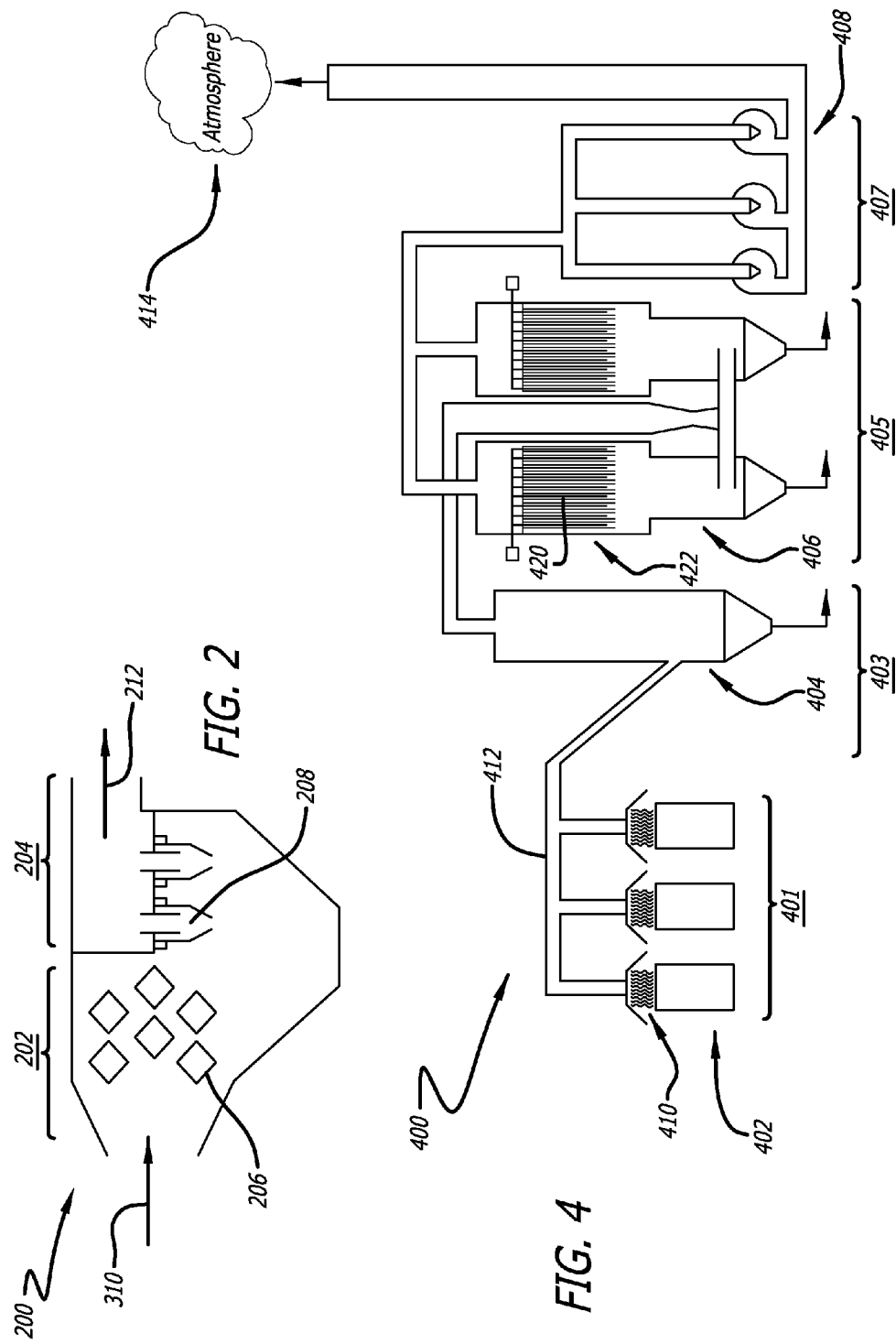
FIG. 2 illustrates an exemplary exhaust heat recovery and cleaning system according to embodiments of the invention, including a buffering system.

FIG. 2 illustrates a portion of an exemplary heat recovery and gas cleaning facility including an exemplary buffering system 200 that may be utilized before an emissions control system or heat recovery system. The system 200 includes a heat buffering system 202 and a particulate buffering system 204. The system 200 reduces the heat profile of the exhaust gas coming from the furnaces, and removes the larger particulates, thus reducing the greatest contributors to wear on system materials and structures. In one embodiment, the exhaust gas from the furnaces may be passed through a chamber lined in thermal insulating brick to temper the temperature profile by absorbing heat from the higher temperature ranges of the cycle.

In one embodiment, exhaust gas 310 from the furnace (not shown) enters the system 200, where the heat variance is tempered and the large particulate removed. In one embodiment, the heat buffering system 202 includes heat sinks 206 to act as a buffer for temperature variation during operation. The heat sinks 206 would therefore absorb excess heat when the exhaust gas temperature increases substantially, thereby reducing the adverse impact on heat recovery and particulate removal structures and materials. For example, the heat sinks 206 are ceramic media formed to absorb excess heat. The heat sinks 206 may be shaped to reduce or eliminate particulate build up, and provide substantially continual contact between the heat sink and the incoming exhaust gas. In one embodiment, the heat sinks may be shaped with a top slope sufficiently angled to reduce particulate build up, providing a slope sufficient to permit deposited particulate to fall from the surface. In one embodiment, the heat sink is a multi-sided diamond shape with the top sections angled at approximately 60 degrees or more from horizontal.

The buffering system 200 may also serve to both cool temperature spikes, as well as raise the temperature when the incoming temperature is low. Sufficient heat sink media, including the ceramic media from the heat buffering system, and the ceramic of the multi-cyclone, greatly flattens the temperature profile. The heat sink materials may be used to absorb heat during a temperature spike, while radiating heat during a temperature low. Thus, the erratic temperature profile of the exhaust gas may be tempered to produce a more even, cyclical temperature variance over a reduced temperature range. Thus, for example, a temperature variance of over 500° C. occurring with multiple local extremes in an interval of 20 minutes or less may be reduced to a 275° C. variance with reduced extremes. Therefore, a jagged temperature profile may be tempered into a smoother sinusoidal profile. In one embodiment, the exhaust gas may have temperature ranges of approximately 480° C. (900° F.) to 1200° C. (2200° F.), 1300° C. (2400° F.), 1500° C. (2800° F.), 1650° C. (3000° F.), or more; with a temperature variance of approximately 250° C. (480° F.), 275° C. (500° F.), 400° C. (750° F.), 500° C. (1000° F.), 800° C. (1500° F.), or more over a 10 minute, 5 minute, or less period. After passing the exhaust gas through the temperature buffering system, the buffered gas may have a temperature range of approximately 480° C. (900° F.) to 1000° C. (1800° F.), and more particularly of approximately 650° C. (1200° F.) to 900° C. (1700° F.).

After the exhaust gas 210 passes the heat buffering system 202, it may enter the particulate buffering system 204. The particulate buffering system removes the large particulate that would cause the most damage to later systems, structures, and materials. For example, the particulate buffering system 204 may remove approximately 95% to 99% of the particulate matter approximately 10 micrometers in size and greater. In one embodiment, the particulate buffering system 204 includes multiple mini-cyclones. The multi-cyclone 208 uses centrifugal force to spin out particles. Substantially cleaner gas then passes out of the exit 210. In one embodiment, the multi-cyclone is a casting made out of ceramic so that it too acts as a heat sink to temper heat spikes from the exhaust gas. For example, the multi-cyclone may be refractory molded.

Heat Recovery

Figure 3:
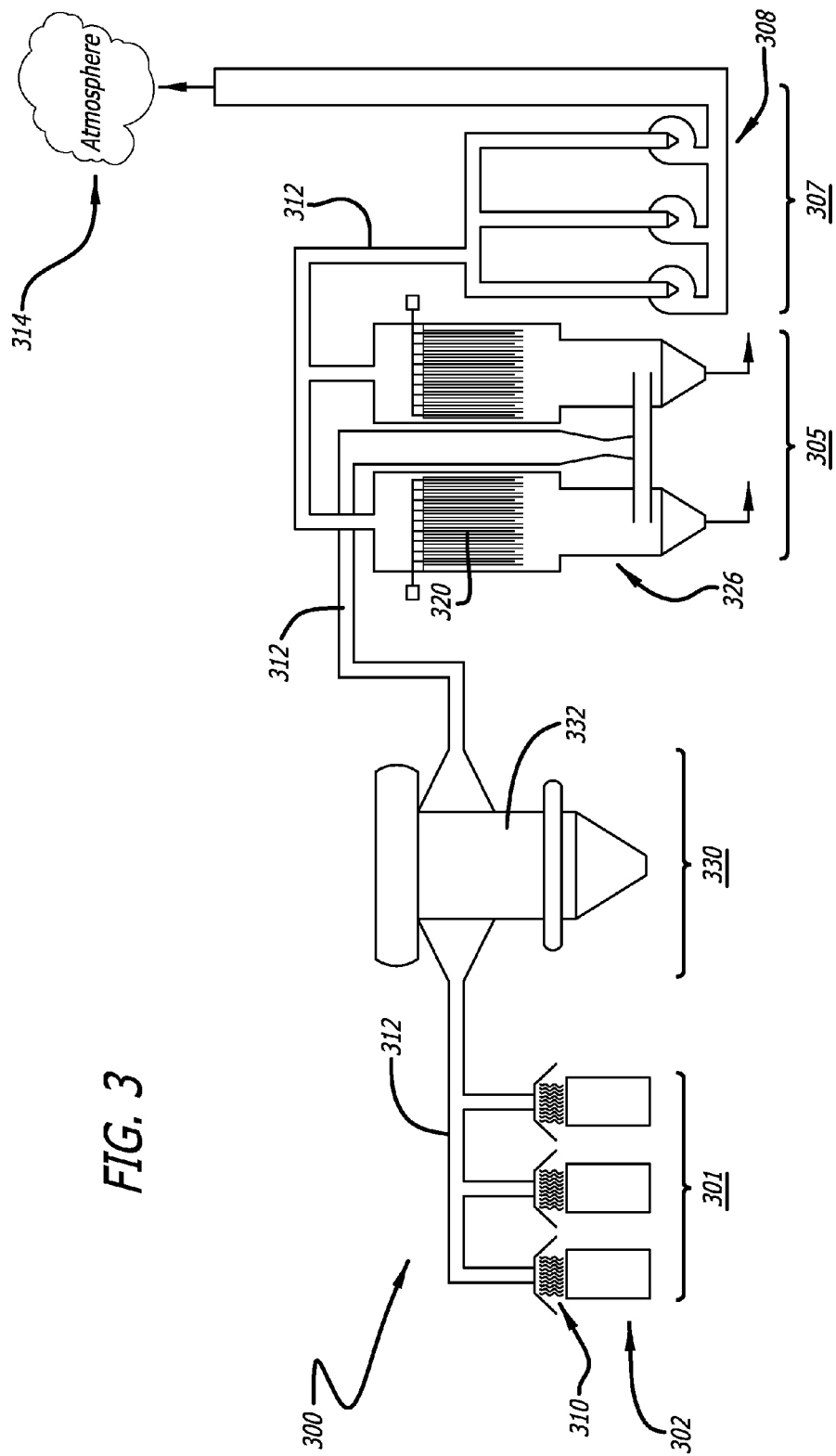
FIG. 3 illustrates an exemplary steel mill system according to embodiments of the invention including heat recovery systems.

FIG. 3 illustrates an exemplary steel mill system according to embodiments of the invention including heat recovery systems. The system 300 includes steelmaking facilities 301, heat recovery system 330, gas cleaning facilities 305, and an exhaust system 307. In one embodiment, the steelmaking facilities 301 include basic oxygen furnaces 302, while the exhaust system includes exhaust fans 308. The heat from the exhaust gases 310 is first recovered before passing the gasses along path 312 to remove the particulate and release into the atmosphere 314. The exhaust gases may be cleaned in the exhaust cleaning facilities 305, which may include a venturi scrubber 306 and a wet electrostatic precipitator 320, as described more fully below. The gasses emitted from the basic oxygen furnaces 302 may exceed 1100° C. (2000° F.), while the main reaction is occurring. In one embodiment, instead of using a gas cooling facility, a heat recovery system 330 is used to create steam, while cooling the gas. After the heat recovery system 330, the exhaust gases may be at a temperature of approximately 200° C. (390° F.). Then, after the gas cleaning facilities 305, the temperature of exhaust gases may drop to approximately 70° C. (150° F.).

In one embodiment, a steam generation boiler 332 is installed after the steelmaking process to receive the hot exhaust gases. The heat recovery system 330 may include features to even the temperature profile as seen by the boiler. For example, additional heat may be supplied by the burning of blast furnace gas carbon monoxide. Preferably, the inlet temperature to the combustion zone prior to the boiler is above the auto-ignition temperature of the exhaust gases (including carbon monoxide), approximately 590° C. (1100° F.). While the temperature is kept above the auto-ignition temperature, the carbon monoxide will react and impart additional heat to the exhaust stream without requiring an additional burner. Thus, the carbon monoxide may be continuously supplied from as an exhaust gas 310 and ignited to increase the low heat content of the lower temperature profile fluctuations. In one embodiment, gas may be supplied at a timed interval to correspond to the exhaust gas temperature profile to add heat when the heat content of the exhaust gas is low.

In one embodiment, the system may be optimized so that the heat recovery steam generator 330 receives a generally uniform temperature during the operation cycle by timing the basic oxygen furnaces 302. Thus, for a system including several furnaces that exhaust into a common pollution control device, the furnaces may be timed to temper the temperature profile received by the heat recovery system and cleaning system. For example, the basic oxygen furnaces 302 would be timed so that the heat recovery boiler 332 would see as uniform a temperature as possible. If a given furnace has an operating cycle of 45 minutes, a first furnace may be run staggered to a second furnace by 15 to 20 minutes. The affect of mixing the low temperature gas with high temperature gas is a moderate temperature profile.

The boiler may be used in conjunction with the buffering system, as described above with respect to FIG. 2, to handle the temperature variance from the furnaces. The tempered temperature profile and the reduced particulate loading will permit significantly longer life to a heat exchange system used after the buffering system 200. In this embodiment, the buffering system 200 would take the exhaust gas 310 from the furnace 302 before entering the boiler 332. The heat recovery system 330 may include different embodiments as described herein. For example, the buffer system of FIG. 3 may be used in combination with the timed furnace firing and the blast furnace CO gas augmentation and combustion, as described herein.

The steam generated from the boiler may be directed to a turbine generator to create electricity. Alternatively, the steam produced from the heat recovery device 330 could be used to off-set existing steam production at the plant, which is normally provided by natural gas or coal fired boilers. The steam may be used for steel cleaning, heat treating, or other applications within the steel mill. The steam turbine generator may be used to produce electricity to minimize the power purchased to run the plant.

Blast Furnace Gas Augmentation

Additional heat may be added by burning additional CO emitted from the blast furnace. By burning the CO from the blast furnace, Btu's (heat content) may be added to the gas stream, increasing the temperature by approximately 1100-1300° C. (2000-2400° F.), which is approximately 250 Btu/ft$^3$ of heat from the blast furnace gas.

For example, instead of attempting to capture the low grade heat content of the unreacted carbon monoxide, or flaring the blast furnace gas that the plant cannot use, the gasses can be completely reacted as part of the buffering system, upstream of the heat recovery system. Thus, the heat from the exothermic reaction of CO and $H_2$ emitted from the basic oxygen furnace and blast furnace exhaust gases to create $CO_2$ and $H_2O$ may be used to add energy to the heat recovery system. Preferably, the exhaust gas has sufficient oxygen to react, and sufficient heat to ignite without the use of a burner. In one embodiment, the exhaust gas maintains sufficient oxygen and temperature, above approximately 590° C. (1100° F.). This is a control and mechanical engineering challenge. Integrating this additional available gas will increase the heat content available to the boiler, increasing steam production and therefore power production. It will also eliminate the need to flare these gasses, reducing emissions, greenhouse gasses and natural gas costs. Thus, in one embodiment, blast furnace gases are added to the exhaust gases leaving the buffering system with a temperature of approximately 650° C. (1200° F.) or more, which auto-ignites the blast furnace gases, providing an additional approximately 1100-1300° C. (2000-2400° F.) to the heat content entering the heat recovery system.

Emission Control

FIG. 4 illustrates an exemplary steel mill system according to embodiments of the invention including emission controls. The exemplary steel mill 400 includes steel making facilities 401, exhaust cooling facilities 403, exhaust cleaning facilities 405, and an exhaust system 407. The steel making facilities 401 may be a basic oxygen furnace 402, which generate exhaust gases 410. The exhaust gases are collected and transported along path 412 through the exhaust cooling facilities 403 and through the exhaust cleaning facilities 405 to cool the exhaust gas and remove particulate. Exhaust fans 408 direct the treated gases to atmosphere 414.

The gas cleaning facilities 405 properly temper the air stream to remove particulate, and may be used in conjunction with standard heat recovery systems. Thus, the tempered exhaust gas stream preferably has a temperature profile between approximately 590° C. to 1000° C. (approximately 1100° F. to 1800° F.). Particulate removal assures that the maximum outlet grain loading does not cause maintenance or heat recovery issues. This allows standard metallurgy, expansion joints, and heat recovery devices to function properly. Thus, embodiments as described herein may be utilized with the buffering system as described above with respect to FIG. 3.

In an exemplary embodiment, the gas cleaning facility 405 includes a venturi scrubber 406 and a wet electrostatic precipitator 420. The gas cleaning facilities 405 is housed within a separation vessel 422. Within the separation vessel 422, downstream of the venturi scrubber 406, is the wet electrostatic precipitator 420. The venturi scrubber 406 is used to remove large and heavy particulate within the exhaust gases 310, while the wet electrostatic precipitator 420 is used to remove the fine and light particulate. Thus, the pressure drop within the venturi scrubber 406 may be reduced, as the venturi is only collecting the easily captured large particles. Then, the wet electrostatic precipitator 420 will be used to collect the fine particles that are more difficult to collect. The wet electrostatic precipitator 420 uses electrostatics that charge the particles, allowing them to collect on an oppositely charged collecting plate. Energy is only applied to the particle, not the entire air stream. Thus, system efficiency is greatly increased by reducing the pressure that the fans need to generate in order to impart the previously required high velocities of the venturi scrubber 406 to remove fine particles. System pressure losses can be reduced from a 35-65 inch water column, down to as low as a 10 inch water column. In one embodiment, variable frequency controllers are used on the fan motors to greatly reduce the fan input power. In an alternate embodiment, smaller fans are used designed for the lower pressure service, and thus reducing fan input power. In one embodiment, the venturi scrubber 406 may be replaced with a low energy device. As the combustible gasses have been eliminated, by oxidizing the carbon monoxide and hydrogen, standard pollution control devices may be used. For example, baghouses and dry precipitators may be used as further pollution control devices after cleaning.

A person of skill in the art would also recognize that embodiments of the present invention may be modified within the scope of the present description. For example, embodiments generally described herein include basic oxygen furnace steel making systems, however, electric arc furnaces may also benefit from embodiments and are considered within the scope of the invention. The electric arc furnace is similar to the above described basic oxygen furnace, as far as the exhaust system is concerned, except that the emissions from the electric arc furnace do not have quite as dramatic a temperature profile. Further, the room in which the furnace sits is evacuated in the off-gas cleaning system. This greatly reduces the exhaust gas temperature that requires treatment, allowing the use of a dry type air pollution control device, such as a baghouse, as opposed to the venturi scrubber described above.

More generally, other heating and cooling applications may benefit from embodiments of the invention, including syngas production. Syngas requires cooling in order to be purified, and then reheated for combustion. If the syngas could be cleaned adequately at a uniform temperature that standard materials can handle, without extremely high priced alloys, then parasitic loads associated with gas treatment prior to end-use would be greatly diminished. This follows suit with many other similar applications where temperatures are artificially reduced for the sole purpose of economically viable particulate removal. Applications artificially reducing temperatures for the purpose of economically viable particulate removal may benefit from embodiments described herein and are considered within the scope of the invention. Embodiments of the invention may utilize waste energy from these systems that cool a substance (e.g. gas or air stream) in order to remove particulate. For example, the waste heat may be collected to produce steam and power. Further, embodiments of the invention may also substantially reduce emissions, such as carbon monoxide and carbon dioxide.

It is important to note that the steel mill process including off-gas heat recovery and particulate collection, including system buffering, embodies numerous novel features that, individually and in combination, distinguish it from prior art of basic oxygen furnace and electric arc furnace steel mills. Although embodiments have been described herein as including specific aspects of the heat recovery and particulate collection systems, these aspects and features are not so limited to the embodiments discussed. Instead various features and aspects of the different embodiments may be interchanged, combined, added, and eliminated in various ways to provide other working heat recovery and particulate collection systems, all of which are considered within the scope of the invention. As such, it may be characterized in a number of ways using one or more of such features. The following paragraphs provide some exemplary characterizations, but the list is not exhaustive as other combinations are contemplated and would be readily apparent to one of average skill in the art after reading the disclosure.

A first characterization is the heat recovery system for an exhaust stream with a variable temperature profile and particulate loading, including a buffering chamber including heat sink surfaces to reduce temperature spikes from the exhaust stream, a particulate buffering chamber including cyclonic areas to separate large particulate from the exhaust stream, and a heat recovery system. When used in a steel mill, the heat recovery system may further include a gas augmentation system to inject gas from a blast furnace into the system before the heat recovery system. In this case, a temperature profile from the buffering chamber may be maintained above the auto-ignition temperature of the blast furnace gas, or approximately 650° C.; otherwise an igniter or duct burner may be added before the heat recovery system to provide the energy to ignite the blast furnace gases. When the exhaust gas is from more than one furnace, the furnaces may be appropriately timed to offset the temperature profiles emitted from each furnace to provide an incoming tempered temperature profile to the buffering chamber. The heat recovery system may be used with an exhaust stream from a basic oxygen furnace, or electric arc furnace. The heat recovery system may be a boiler. The system may also be used with an emissions control device, such as a venturi scrubber, and/or a wet electrostatic precipitator.

The buffering chamber may include angled heat sink surfaces to reduce particulate build-up. The heat sink surfaces may form one or more diamond shapes to contact the exhaust stream. The diamond shapes may include upper surfaces angled to reduce particulate build-up, and may be angled by 60° or more. The buffering chamber and/or the heat sink surfaces may be a ceramic media to absorb heat from temperature spikes and radiate heat during temperature lows. Thus, the temperature profile leaving the buffering chamber may range from about 650° C. to about 900° C. Generally, the stream exiting the buffering chamber is maintained above about 650° C. and/or below 1000° C. The phrase "chamber" indicates a general area to provide temperature and/or particulate buffering. Thus, the buffering chamber and particulate buffering chamber may be combined into a single chamber, either utilizing the same space or separate space within a larger chamber. The buffering chamber and particulate chamber may be semi-separated, such as by a partition or other semi-divider, or may be fully segregated, such as by utilizing individual and distinct chambers. Thus, "chamber" is intended to include separate and distinct chambers, vessels, or housings, as well as areas within a larger chamber, vessel, or housing.

A second characterization is a heat recovery and particulate removal system for an exhaust stream with a variable temperature profile and particulate loading, including a temperature buffering section to reduce a temperature variance of the exhaust stream from over approximately 500° C. to under approximately 500° C., a particulate buffering section separating particulate of about 10 micrometers or more from the exhaust stream; a heat recovery system; and an emissions control system. The heat recovery and particulate removal system may be used with exhaust streams with a temperature variance of 250° C., 275° C., 400° C., 500° C., 800° C., or more over a 10 minute, 5 minute, or less period, or a total extreme temperature variance of 500° C., 700° C., 850° C., 900° C., 1000° C., 1100° C. or more. The temperature buffering section may reduce the total temperature variance to 500° C., 400° C., 300° C., 250° C., or less. The temperature buffering section may further reduce the local volatility of the temperature profile providing a smoother temperature profile. Thus, the local temperature variance may be reduced to 400° C., 250° C., 100° C., or less over a period 5 minutes, 10 minutes, 15 minutes, or more.

As the foregoing text and figures make apparent, a further characterization includes a method of preparing an exhaust stream for heat recovery and particulate removal including extracting an exhaust stream including a fluctuating temperature range having a variance of approximately 400° C. or more and a variable particulate load from a source, contacting the exhaust stream with a plurality of heat sink surfaces to produce a temperature buffered stream, wherein a temperature spike of the exhaust stream is reduced through heat absorption, separating particulates greater than about 10 micrometers from the temperature buffered stream to produce a temperature and particulate buffered stream, wherein the particulates are removed through cyclonic separation, and passing the temperature and particulate buffered stream to a heat recovery system. Doing so may involve one or more of the following steps, either individually or in combination: flowing the temperature and particulate buffered stream from the heat recovery system through an emissions control system, which may include a venturi scrubber and/or a wet electrostatic precipitator, augmenting the temperature and particulate buffered stream with gas rich in CO before passing to the heat recovery system, creating the exhaust stream from furnaces, such as basic oxygen furnaces or electric arc furnaces, during the production of steel, and creating the exhaust stream from syngas production.

Advantages of the embodiments described herein include, but are not limited to: less electrical energy to move the gas stream through the process, generally in the form of less electrical energy consumed by fans; recovery of significant waste heat energy, offsetting coal and or natural gas boiler combustion, recovery of valuable blast furnace gas currently being flared, offsetting natural gas igniter use on the flare and coal/natural gas use in the boiler, significant reduction in plant carbon monoxide emissions, and potential electrical energy production via a steam turbine generator.

Figure 5:
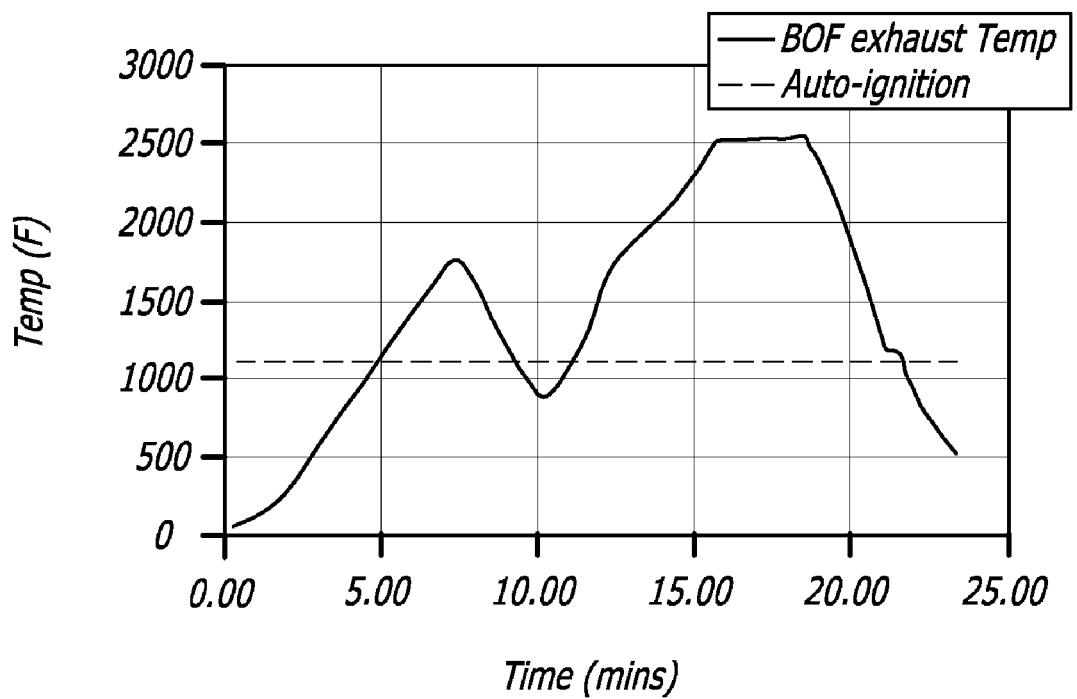
FIG. 5 illustrates an exemplary measured temperature profile of exhaust gases from a basic oxygen furnace.

As described herein, the terms 'approximately' and 'about' are used to describe general parameters, including temperature ranges. These terms are used to incorporate parameters and ranges that are within the standard operating conditions of the system according to embodiments as described. For example, when using a basic oxygen furnace, the exhaust temperature may range from approximately 500° C. to 1400° C. FIG. 5 illustrates an exemplary temperature profile as measured from a basic oxygen furnace. As seen, the temperature may vary from approximately 900° F. to over 2500° F. (the upper limit of the thermocouple used to measure the temperature). However, the temperature may be up to or over 3000° F. Because these ranges are approximate, they are intended to include the actual working temperatures close to these values. Therefore, an actual working temperature range of 450° C. to 1450° C. is considered within the approximate range of the disclosed temperature range. Further, as described herein the term "large" with respect to the particulate loading is intended to include the larger range of particulate that is exhausted from a source utilizing embodiments as described herein. Therefore, removing the "larger" particulate may include removing those particles with the greatest size or weight. For example, removing large particulate may include removing the top 10% of the particles as ranked by weight, or removing particles over approximately 10 micrometers.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A heat recovery system for an exhaust stream with a variable temperature profile and particulate loading, comprising:
    a buffering chamber including heat sink surfaces to reduce temperature spikes from the exhaust stream, the buffering chamber providing heat to the exhaust stream to prevent an exit temperature from falling below approximately 650 ° C.;
    a particulate buffering chamber including cyclonic areas to separate large particulate from the exhaust stream; and
    a heat recovery chamber.

2. The heat recovery system of claim 1, wherein the heat sink surfaces are angled to reduce particulate build-up.

3. The heat recovery system of claim 1, wherein the heat sink surfaces together form one or more diamond-shaped members.

4. The heat recovery system of claim 1, further comprising an augmentation system to provide gas from a blast furnace to the exhaust stream before entering the heat recovery system.

5. A heat recovery system for an exhaust stream with a variable temperature profile and particulate loading, comprising:
    a buffering chamber including heat sink surfaces to reduce temperature spikes from the exhaust stream, wherein the buffering chamber provides heat to the exhaust stream to prevent an exit temperature from falling below the auto-ignition temperature of CO gas;
    a particulate buffering chamber including cyclonic areas to separate large particulate from the exhaust stream; and
    a heat recovery chamber.

* * * * *